United States Patent Office 2,984,683
Patented May 16, 1961

2,984,683

ORGANOPHOSPHORUS COMPOUNDS AND METHODS OF PREPARING SAME

Sheldon A. Buckler, Stamford, Conn., assignor to American Cyanamid Company, New York, N.Y., a corporation of Maine No Drawing. Filed Oct. 13, 1958, Ser. No. 766,656

10 Claims. (Cl. 260—500)

The present invention relates to new and useful organophosphorus compounds, and more particularly to 2,4,6-trisecondary-alkyl-1,3-dioxa-5-phosphacyclohexanes and derivatives thereof corresponding to the formula

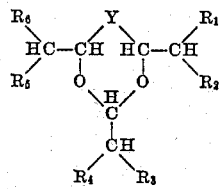

wherein $R_1$ to $R_6$ represent alkyl chains of 1 to 10 carbon atoms, and, as will be seen hereinafter, $R_1$, $R_2$, $R_3$, $R_4$, $R_5$ and $R_6$ may be the same or different radicals; Y represents PH; $PR_a$;

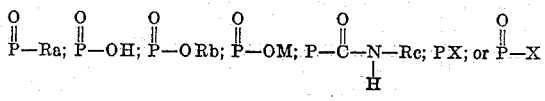

When Y is $PR_a$ or

the Ra group represents substituted and unsubstituted, saturated and unsaturated, branched and straight chain aliphatic hydrocarbon radicals; substituted and unsubstituted aryl radicals; saturated and unsaturated, substituted and unsubstituted alicyclic radicals; said substituted radicals carrying substituents including halogen carbamyl cyano, amino, hydroxyl, acyloxy, carbalkoxy, carboxy, alkoxy, aryl, aryloxy, and the like.

When Y is

the ester derivative of

Rb represents a hydrocarbon radical including methyl, ethyl, propyl, octyl, phenyl, and the like. By the same token, when Y is

the salt derivative of

M represents mono- and polyvalent metals, including the alkali metals (Na, K, and the like), the alkaline earth metals (Ba, Ca, and the like), zinc, mercury, and the like.

When Y is

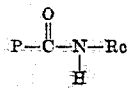

the alkylcarbamyl and arylcarbamyl derivatives of the compounds contemplated herein are intended, Rc including phenyl, chlorophenyl, ethyl, butyl, chloroethyl, and the like.

When Y is PX, a radical representing the halogenated 1,3-dioxa-5-phosphacyclohexanes of the instant discovery is intended, in which X includes Cl, Br, and the like. Similarly, other halogenated derivatives of the present invention are contemplated when Y is

X including Cl, Br, and the like.

According to the present invention an alkyl aldehyde having an alkyl branch in the alpha position, such as isobutyraldehyde, and corresponding to the formula

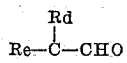

in which Rd and Re represent alkyl chains of 1 to 10 carbon atoms, is reacted with phosphine in the presence of an aqueous mineral acid solution to produce the corresponding 2,4,6 - trisecondaryalkyl - 1,3-dioxa-5-phosphacyclohexane, such as 2,4,6-triisopropyl-1,3-dioxa-5-phosphacyclohexane. If desired, a water-soluble, inert organic solvent may be present, such as tetrahydrofuran, dioxane, a lower aliphatic monohydric alcohol, the dimethyl ether of ethylene glycol, and the like.

As will be seen in greater detail hereinafter, the 2,4,6-trisecondaryalkyl - 1,3-dioxa-5-phosphacyclohexanes thus produced may be converted to their corresponding phosphinic acids (>POOH) by oxidation with air, for example. These acids may then be reacted to produce their respective esters and salts. For example, 2,4,6-triisopropyl-1,3-dioxa-5-phosphacyclohexane-5-inoic acid produced by the oxidation of 2,4,6-triisopropyl-1,3-dioxa-5-phosphacyclohexane may be reacted with NaOH as contemplated herein to yield the corresponding sodium 2,4,6-triisopropyl-1,3-dioxa-5-phosphacyclohexane-5-inate.

Likewise, the 2,4,6-trisecondaryalkyl-1,3-dioxa-5-phosphacyclohexanes of the instant discovery may be reacted with para-chlorophenylisocyanate, and the like, to produce the corresponding 5-(para-chlorophenylcarbamyl)-2,4,6 - trisecondaryalkyl - 1,3 - dioxa - 5 - phosphacyclohexanes.

Other typical products within the purview of the present invention are prepared by reacting a 2,4,6-trisecondaryalkyl - 1,3-dioxa-5-phosphacyclohexane with 1-octene or $COCl_2$ to produce, respectively, the corresponding 2, 4,6 - trisecondaryalkyl - 5 - octyl - 1,3 - dioxa - 5 - phosphacyclohexane or 2,4,6-trisecondaryalkyl-5-chloro-1,3-dioxa-5-phosphacyclohexane. In addition, 2,4,6-trisecondaryalkyl - 5 - octyl - 1,3 - dioxa - 5 - phosphacyclohexane may be reacted with $H_2O_2$ to produce 2,4,6-trisecondaryalkyl - 5 - octyl - 1,3 - dioxa - 5 - phosphacyclohexane-5-oxide.

Similarly, a 2,4,6-trisecondaryalkyl-1,3-dioxa-5-phosphacyclohexane-5-inoic acid may be reacted under the conditions contemplated herein with $SOCl_2$ to produce the corresponding 2,4,6 - trisecondaryalkyl-1,3-dioxa-5-phosphacyclohexane-5-inoyl chloride.

The aqueous mineral acid employed in the reaction of phosphine with an alkyl aldehyde as defined above doubles as catalyst and solvent. Among the mineral acids contemplated herein are HCl, HBr, HI, $H_2SO_4$, $H_3PO_4$, and the like. While concentrated mineral acids are preferred, concentrations in the range of 0.1 to 12 normal are suitable.

In general, the reactions of the instant discovery are carried out at temperatures in the range of 0° C. to 80° C., preferably, 15° C. to 60° C.

Among the numerous alkyl aldehydes suitable for the present invention, in addition to isobutyraldehyde, are 2-ethylhexaldehyde, 2-ethylbutyraldehyde, 2-methyloctaldehyde, 2-propylpentaldehyde, 2-methylheptaldehyde, and the like.

The amount of aldehyde employed in the reaction with respect to phosphine is, generally, at least 3 molar equivalents of aldehyde per molar equivalent of phosphine. However, excesses of either constituent as great as 10:1, aldehyde to phosphine, or phosphine to aldehyde, or even greater, are suitable.

The present invention will best be understood by reference to the following illustrative examples. The limitations contained in these examples are not to be considered as restrictions upon the scope of the invention, since it will be obvious to one skilled in the art that numerous modifications within the purview of the invention are possible and, by the same token, are contemplated herein.

EXAMPLE I

*2,4,6-triisopropyl-1,3-dioxa-5-phosphacyclohexane*

A one-liter, three-necked reactor flask was equipped with a gas inlet tube, an addition funnel, a mechanical stirrer and a gas bubbler device so disposed that all exit gases from the flask passed upwardly therethrough, the bubbler device comprising a column containing a two-inch head of water. The reactor flask was charged with a solution mixture at ambient temperature (21° C.–23° C.) of 200 milliliters of concentrated aqueous solution of hydrochloric acid containing 37.7 percent Hcl by weight and 200 milliliters of tetrahydrofuran.

Subsequently the flask system and the charge were purged substantially free of oxygen-containing gas with nitrogen gas, and then a total of 108 grams (1.5 moles) of isobutyraldehyde and 17 grams (0.5 mole) of gaseous phosphine, at ambient temperature (21° C.–23° C.), was slowly and continuously introduced into the charge over a period of 30 minutes.

A reaction mixture resulted which, after settling for 30 minutes, left an upper organic layer or phase which was separated from the remaining reaction mixture and distilled under reduced pressure. A total of 91 grams (78 percent of theory) of product 2,4,6-triisopropyl-1,3-dioxa-5-phosphacyclohexane was thus collected as a colorless liquid having a boiling point of 100° C.–101° C. at 8 millimeters pressure. The material had a pungent odor and a refractive index of $n_D^{25}=1.4602$. *Analysis.*— Calculated for $C_{12}H_{25}O_2P$: C, 62.04; H, 10:85; P, 13.34. Found: C, 61.82; H, 10.78; P, 13.26.

EXAMPLE II

The procedure described in Example I was repeated with the exception that the tetrahydrofuran was omitted. The same product and yield (equivalent to 78 percent of theory) were obtained.

EXAMPLE III

*2,4,6-tris(3-heptyl)-1,3-dioxa-5-phosphacyclohexane*

The reactor flask in Example I was charged instead with a mixture of 125 milliliters of a concentrated aqueous solution of hydrochloric acid containing 37.7 percent HCl by weight and 125 milliliters of tetrahydrofuran, and a total of 66.5 grams (0.52 mole) of 2-ethylhexaldehyde and 6.2 grams (0.18 mole) of phosphine at ambient temperature (21° C.–23° C.) was added uniformly with agitation in the course of 30 minutes. A reaction mixture resulted having an upper organic phase which was separated from the remaining reaction mixture and distilled under reduced pressure. A total of 61.1 grams (90 percent of theory) of 2,4,6-tris(3-heptyl)-1,3-dioxa-5-phosphacyclohexane as a colorless liquid product was recovered having a boiling point of 148° C. to 153° C. at 0.025 millimeter pressure and having a refractive index of $n_D^{24}=1.4709$. *Analysis.*—Calculated for $C_{24}H_{29}O_2P$: C, 71.95; H, 12.33; P, 7.73. Found: C, 71.87; H, 12.62; P, 7.57.

EXAMPLE IV

The procedure described in Example III was repeated except that the reactor was charged instead with 200 milliliters of a concentrated aqueous solution of hydrochloric acid containing 37.7 percent HCl by weight and no tetrahydrofuran was employed. A total of 59 grams (85 percent of theory) of the product was obtained.

EXAMPLE V

*2,4,6-triisopropyl-1,3-dioxa-5-phosphacyclohexane-5-inoic acid*

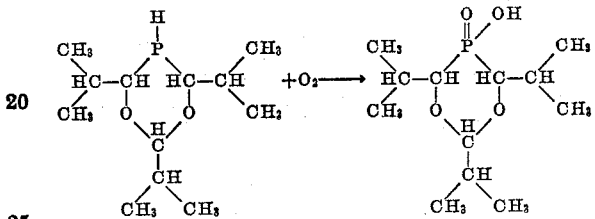

A solution of 30 grams (0.13 mole) of 2,4,6-triisopropyl-1,3-dioxa-5-phosphacyclohexane, produced as in Example I, above, in 125 milliliters of isopropyl alcohol was prepared and a stream of air passed into this solution at the rate of 75 milliliters per minute for 4 hours at ambient temperautre (21° C.–23° C.). The resulting solution was then concentrated to 100 milliliters and 25 milliliters of water was added thereto. A solid precipitated which was collected and dried to give 20.1 grams of product 2,4,6 - triisopropyl - 1,3 - dioxa-5-phosphacyclohexane-5-inoic acid having a melting point of 158° C.–160° C. Recrystallization from a water-isopropyl alcohol mixture gave a product having a melting point of 159° C.–160° C. *Analysis.*—Calculated for $C_{12}H_{25}O_4P$: C, 54.53; H, 9.53; P, 11.72. Found: C, 54.51; H, 9.44; P, 11.95.

EXAMPLE VI

*5-(para-chlorophenylcarbamyl)-2,4,6-triisopropyl-1,3-dioxa-5-phosphacyclohexane*

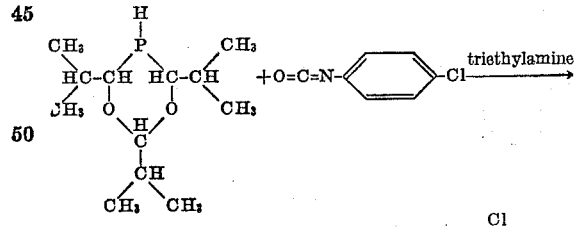

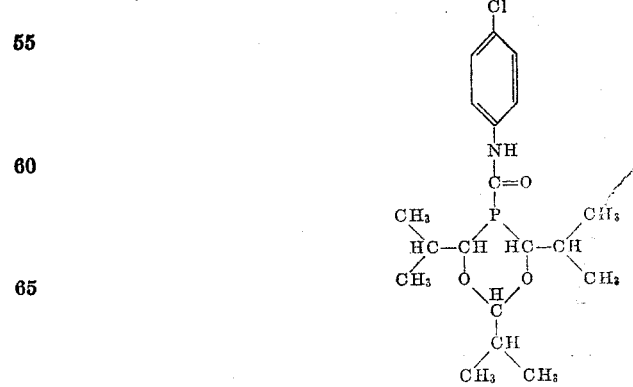

A solution of 11.6 grams (0.05 mole) of the product of Example I, above, and 7.67 grams (0.05 mole) of p-chlorophenylisocyanate in dry benzene was prepared and a small catalytic amount of triethylamine added thereto. The resulting mixture was then heated under reflux for 23 hours, cooled, evaporated and the resulting product recrystallized from methanol to give 8.6 grams of 5-(p-chlorophenylcarbamyl) - 2,4,6 - triisopropyl - 1,3-dioxa-5-phosphacyclohexane having a melting point of 158° C.–160° C., a yield equivalent to 42 percent of theoretical. Recrystallization of the product from ethanol gave a melting point of 162–162.5° C. *Analysis.*—Calculated for $C_{19}H_{29}ClNO_3P$: C, 59.14; H, 7.58; P, 8.03. Found: C, 58.88; H, 7.89; P, 8.14.

EXAMPLE VII

*5-ethylcarbamyl-2,4,6-triisopropyl-1,3-dioxa-5-phosphacyclohexane*

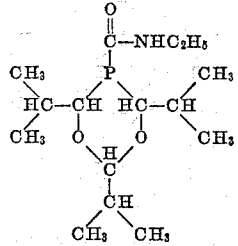

A solution of 11.6 grams (0.05 mole) of 2,4,6-triisopropyl-1,3-dioxa-5-phosphacyclohexane, produced as in Example I, above, 3.56 grams (0.05 mole) of ethyl isocyanate, and 0.1 gram of triethylamine in 20 milliliters of toluene is prepared and heated under reflux for 48 hours. The toluene and triethylamine are then removed by evaporation leaving the product 5-ethylcarbamyl-2,4,6-triisopropyl-1,3-dioxa - 5 - phosphacyclohexane as residual solid material.

EXAMPLE VIII

*2,4,6-triisopropyl-1,3-dioxa-5-phosphacyclohexane-5-inoyl chloride*

Thirteen and two-tenths grams (0.05 mole) of the phosphinoic acid produced as in Example V, above, is combined with 35 milliliters of thionyl chloride and heated under gentle reflux for one hour. The excess thionyl chloride is then removed by distillation, leaving the product 2,4,6-triisopropyl-1,3-dioxa-5-phosphacyclohexane-5-inoyl chloride as a residual oil and having the structural formula

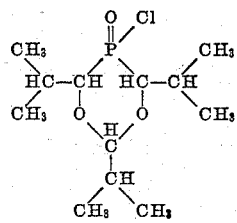

EXAMPLE IX

*Sodium 2,4,6-triisopropyl-1,3-dioxa-5 - phosphacyclohexane-5-inate*

Thirteen and two-tenths grams (0.05 mole) of the phosphinoic acid produced as in Example V, above, is suspended in 100 milliliters of water and a solution of 2.0 grams (0.05 mole) of sodium hydroxide in 10 milliliters of water is added. The mixture is stirred until all the acid is dissolved and the resulting solution is evaporated to give the product sodium 2,4,6-triisopropyl-1,3-dioxa-5-phosphacyclohexane-5-inate in solid form and having the structural formula

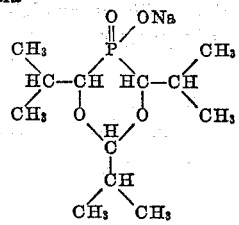

EXAMPLE X

*Ethyl 2,4,6-triisopropyl-1,3-dioxa-5-phosphacyclohexane-5-inate*

Fourteen and one-tenth grams (0.05 mole) of the phosphinoyl chloride, produced as in Example VIII, above, is added continuously during a period of 30 minutes and at ambient temperature (21° C. to 23° C.) to 50 milliliters of anhydrous ethyl alcohol. The resulting solution is refluxed gently for an additional 30 minutes and then evaporated to give the product as solid residual matter and having the structural formula

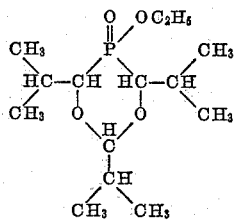

EXAMPLE XI

*2,4,6-triisopropyl-5-octyl-1,3-dioxa-5-phosphacyclohexane*

A solution of 23.2 grams (0.1 mole) of 2,4,6-triisopropyl-1,3-dioxa-5-phosphacyclohexane, produced as in Example I, above, 11.2 grams (0.1 mole) of 1-octene, and 1.64 grams (0.01 mole) of α,α′-azo-bisisobutyronitrile in 100 milliliters of benzene is prepared and heated at 85° C. for one hour. Distillation of the thus-heated reaction solution yields the product

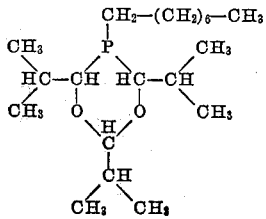

in liquid form.

EXAMPLE XII

*2,4,6-triisopropyl-5-chloro-1,3-dioxa-5-phosphacyclohexane*

A solution of 11.6 grams (0.05 mole) of 2,4,6-triisopropyl-1,3-dioxa-5-phosphacyclohexane, produced as in Example I, above, in 50 milliliters of hexane is prepared and phosgene is passed into this solution at ambient temperature (21° C.–23° C.) until no further reaction occurs. Distillation of the resulting reaction solution yields the product

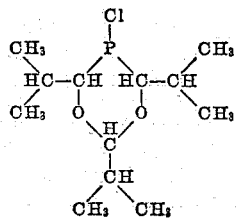

in liquid form.

EXAMPLE XIII

*2-(3-hexyl)-4,6-diisopropyl-1,3-dioxa-5-phosphacylohexane*

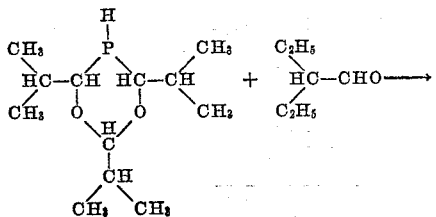

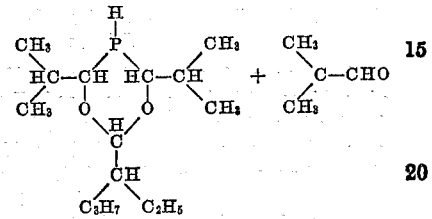

A solution of 11.6 grams (0.05 mole) of 2,4,6-triisopropyl-1,3-dioxa-5-phosphacyclohexane, produced as in Example I, above, 11.4 grams (0.1 mole) of 2-ethylpentaldehyde and 1 milliliter of a concentrated aqueous solution of hydrochloric acid containing 37.7 percent HCl by weight is prepared and heated to boiling in an apparatus arranged for slow distillation. Isobutyraldehyde is thus formed and collected slowly over a period of 2 hours and the product desired, 2-(3-hexyl)-4,6-diisopropyl-1,3-dioxa-5-phosphacyclohexane, is then recovered from the remaining solution in liquid form by fractional distillation at a reduced pressure.

EXAMPLE XIV

*2,4,6-triisopropyl-5-octyl-1,3-dioxa-5-phosphacyclohexane-5-oxide*

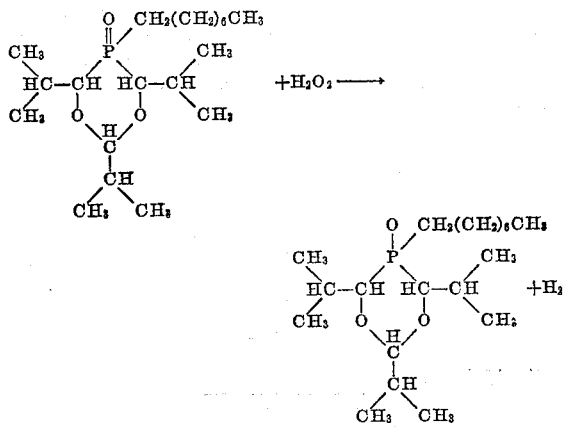

A solution of 17.2 grams (0.05 mole) of 2,4,6-triisopropyl-5-octyl-1,3-dioxa-5-phosphacyclohexane (produced as in Example XI, above) in 50 milliliters of acetic acid is prepared and 1.7 grams (0.05 mole) of hydrogen peroxide is added. The solution is heated at 60° C. for 1 hour, and the product is then recovered as a residue by evaporation of the solution.

The novel products of the present invention are useful as gasoline additives for preventing pre-ignition of gasoline caused by lead deposits and the like. For example, up to about 5 milliliters of 2,4,6-triisopropyl-1,3-dioxa-5-phosphacyclohexane added to one gallon of gasoline effectively suppresses pre-ignition.

While the present invention has been described in detail with respect to specific embodiments thereof, it is not intended that these details, except insofar as they appear in the appended claims, be considered as restrictions upon the scope of the invention.

I claim:

1. 2,4,6 - trisecondaryalkyl - 1,3 - dioxa - 5 - phosphacyclohexanes in which the alkyl moiety contains from 1 to 10 carbon atoms.
2. 2,4,6-triisopropyl-1,3-dioxa-5-phosphacyclohexane.
3. 2,4,6 - trisecondaryalkyl - 1,3 - dioxa - 5 - phosphacyclohexane-5-inoic acids in which the alkyl moiety contains from 1 to 10 carbon atoms.
4. 2,4,6 - triisopropyl - 1,3 - dioxa - 5 - phosphacyclohexane-5-inoic acid.
5. 5 - (para - chlorophenylcarbamy) - 2,4,6 - triisopropyl-1,3-dioxa-5-phosphacyclohexane.
6. 2,4,6 - triisopropyl - 5 - chloro - 1,3 - dioxa - 5-phosphacyclohexane.
7. A method of preparing a 2,4,6-trisecondaryalkyl-1,3-dioxa-5-phosphacyclohexane having the formula

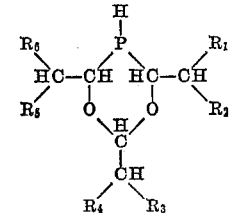

wherein $R_1$ to $R_6$ represent alkyl chains of 1 to 10 carbon atoms, which comprises bringing an alkyl aldehyde having an alkyl branch in the alpha position, and having the formula

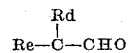

wherein Rd and Re represent alkyl chains having the same number of carbon atoms as $R_1$ to $R_6$ in the above formula, into contact with phosphine in the presence of an aqueous mineral acid solution, and recovering the resulting 2,4,6 - trisecondaryalkyl-1,3-dioxa-5-phosphacyclohexane.

8. Organophosphorus compounds of the formula

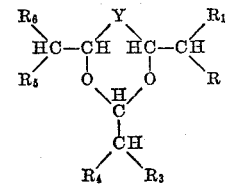

wherein $R_1$–$R_6$ represent alkyl chains of 1 to 10 carbon atoms; Y represents a radical selected from the group consisting of PH, PRa,

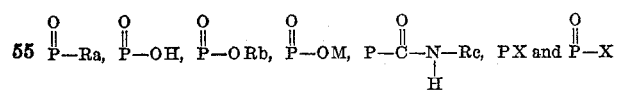

P represents phosphorus; PRa and

represent derivatives of the above formula in which P is a member selected from the group consisting of al[kyl] having 1 to 8 carbon atoms and substituted alkyl hav[ing] 1 to 8 carbon atoms, the substituents being selected [from] the group consisting of halogen, cyano, amino, hydro[xy]

represents the ester group derived from

Rb being selected from the group consisting of alkyl having from 1 to 8 carbon atoms and phenyl;

$$\overset{O}{\underset{\|}{P}}-OM$$

represents the salt group derived from $$\overset{O}{\underset{\|}{P}}-OH$$

M being selected from the group consisting of alkali metal, alkaline earth metal, zinc and mercury;

$$\overset{O}{\underset{\|}{P}}-\overset{}{\underset{\underset{H}{|}}{C}}-N-Rc$$

represents the carbamyl derivatives of the compounds represented by the above formula, Rc being selected from the group consisting of lower alkyl, phenyl, chloro-substituted lower alkyl, and chloro-substituted phenyl; and PX and $$\overset{O}{\underset{\|}{P}}-X$$

represent moieties of the above formula, X representing a halogen atom.

9. A method of preparing a 2,4,6-trisecondaryalkyl-1,3-dioxa-5-phosphacyclohexane having the formula

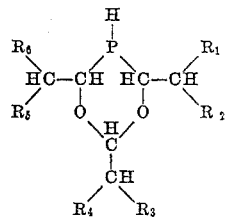

wherein $R_1$ to $R_6$ represent alkyl chains of 1 to 10 carbon atoms, which comprises bringing an alkyl aldehyde having an alkyl branch in the alpha position, and having the formula

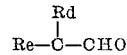

wherein Rd and Re represent alkyl chains having the same number of carbon atoms as $R_1$ to $R_6$ in the above formula, into contact with phosphine at a temperature in the range of 0° C. to 80° C. and in the presence of an aqueous mineral acid solution, and recovering the resulting 2,4,6-trisecondaryalkyl-1,3-dioxa-5-phosphacyclohexane.

10. The process of claim 9 in which the reactants are brought into contact in the presence of a water-soluble, inert organic solvent.

References Cited in the file of this patent

Kosolapoff: Organo Phosphorus Compounds, page 15, Wiley & Sons, N.Y. (1950).

UNITED STATES PATENT OFFICE
CERTIFICATION OF CORRECTION

Patent No. 2,984,683                                May 16, 1961

Sheldon A. Buckler

It is hereby certified that error appears in the above numbered patent requiring correction and that the said Letters Patent should read as corrected below.

Column 7, lines 6 to 9, the right-hand portion of the formula should appear as shown below instead of as in the patent:

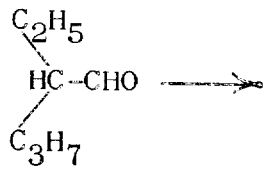

same column 7, lines 39 to 55, the formula should appear as shown below instead of as in the patent:

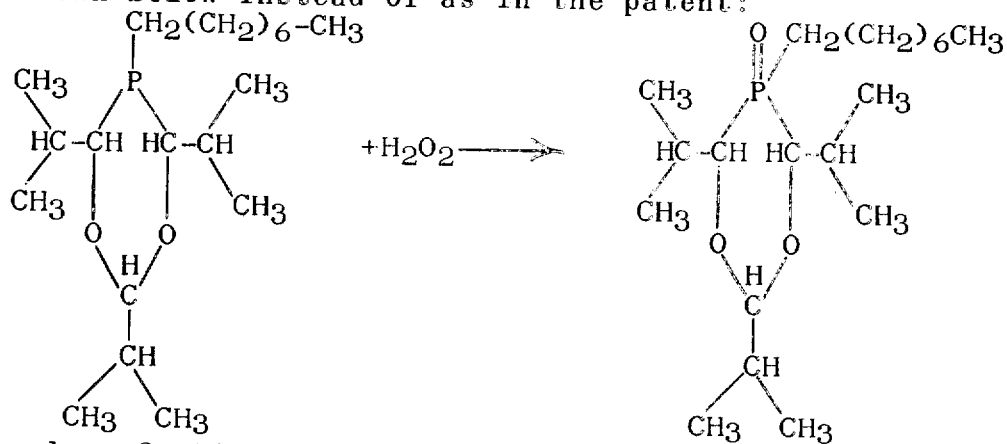

column 8, lines 41 to 48, the formula should appear as shown below instead of as in the patent:

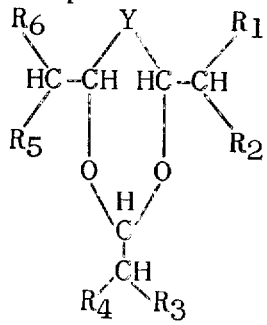

(SEAL)
Attest:        Signed and sealed this 31st day of October 1961.

ERNEST W. SWIDER                      DAVID L. LADD
Attesting Officer                            Commissioner of Patents